US011944165B2

(12) United States Patent
Matsui et al.

(10) Patent No.: US 11,944,165 B2
(45) Date of Patent: Apr. 2, 2024

(54) MOLDED SURFACE FASTENER

(71) Applicant: YKK Corporation, Tokyo (JP)

(72) Inventors: Takayuki Matsui, Kurobe (JP); Xu Zhang, Kurobe (JP); Zhiyu Ren, Kurobe (JP); Shinichi Imai, Kurobe (JP)

(73) Assignee: YKK Corporation, Tokyo (JP)

( * ) Notice: Subject to any disclaimer, the term of this patent is extended or adjusted under 35 U.S.C. 154(b) by 65 days.

(21) Appl. No.: 17/429,879

(22) PCT Filed: Feb. 15, 2019

(86) PCT No.: PCT/JP2019/005598
§ 371 (c)(1),
(2) Date: Aug. 10, 2021

(87) PCT Pub. No.: WO2020/166069
PCT Pub. Date: Aug. 20, 2020

(65) Prior Publication Data
US 2022/0202144 A1 Jun. 30, 2022

(51) Int. Cl.
A44B 18/00 (2006.01)

(52) U.S. Cl.
CPC .......... *A44B 18/0076* (2013.01); *Y10T 24/27* (2015.01)

(58) Field of Classification Search
CPC .. A44B 18/0049; A44B 18/0076; Y10T 24/27
See application file for complete search history.

(56) References Cited

U.S. PATENT DOCUMENTS

| 5,180,618 | A | * | 1/1993 | Kessler | ............. | A44B 18/0076 |
| | | | | | | 24/444 |
| 5,260,015 | A | | 11/1993 | Kennedy et al. | | |
| 5,441,687 | A | | 8/1995 | Murasaki et al. | | |

(Continued)

FOREIGN PATENT DOCUMENTS

| EP | 2684480 A1 | 1/2014 |
| GB | 2364351 A | 1/2002 |

(Continued)

OTHER PUBLICATIONS

Office Action, Chinese Patent Application No. 201980092052.7, dated May 7, 2022, 13 pages.

(Continued)

*Primary Examiner* — Robert Sandy
*Assistant Examiner* — Michael S Lee
(74) *Attorney, Agent, or Firm* — Kilpatrick Townsend & Stockton LLP

(57) ABSTRACT

The molded surface fastener includes: a fastener member that has a plurality of engagement elements disposed upright on the first surface of a base portion, and a back member that is secured to the second surface of the fastener member and that is provided with a structure enabling passage of a synthetic resin. The base portion has a first base region of a predetermined thickness and a second base region formed to be thicker than the first base region, and the back member is secured to at least the second base region of the base portion. The adhesion strength of the back member to the fastener member is thus increased, enabling the back member to be held more firmly by the base portion.

5 Claims, 7 Drawing Sheets

(56) References Cited

U.S. PATENT DOCUMENTS

| | | | |
|---|---|---|---|
| 5,985,407 A | 11/1999 | Murasaki | |
| 2008/0222856 A1* | 9/2008 | Poulakis | A44B 18/0076 |
| | | | 24/452 |
| 2013/0340214 A1 | 12/2013 | Terada et al. | |
| 2014/0298628 A1* | 10/2014 | Minato | A44B 18/0076 |
| | | | 24/449 |
| 2015/0335106 A1* | 11/2015 | Okuda | A44B 18/0049 |
| | | | 24/443 |
| 2016/0198811 A1* | 7/2016 | Mahe | B29C 44/1271 |
| | | | 24/444 |
| 2016/0331085 A1* | 11/2016 | Mizumoto | A44B 18/0049 |
| 2017/0150788 A1* | 6/2017 | Imai | A47C 7/18 |
| 2017/0245602 A1 | 8/2017 | Nakaya et al. | |

FOREIGN PATENT DOCUMENTS

| | | |
|---|---|---|
| JP | 6-38811 A | 2/1994 |
| JP | 9-308509 A | 12/1997 |
| KR | 101509375 B1 | 4/2015 |
| WO | 2012/120618 A1 | 9/2012 |
| WO | 2016/002049 A1 | 1/2016 |

OTHER PUBLICATIONS

International Search Report, PCT Patent Application No. PCT/JP2019/005598, dated Apr. 23, 2019.
Decision of Refusal, Chinese Patent Application No. 201980092052.7, dated Nov. 3, 2022, 14 pages.
Extended European Search Report, European Patent Application No. 19915428.7, dated Feb. 10, 2022, 7 pages.
Office Action, Korean Patent Application No. 10-2021-7029128, dated Jan. 19, 2023, 10 pages.

\* cited by examiner

MOLDED SURFACE FASTENER

TECHNICAL FIELD

The invention relates to a molded surface fastener that has a plurality of engagement elements on a first surface of a plate-shaped base portion and a back member secured to a second surface of the base portion, and relates to a method for manufacturing the molded surface fastener.

BACKGROUND ART

Seats for automobiles and trains, various sofas, office chairs, and the like, are sometimes constructed by covering the surface of a cushion body (foam), molded into a predetermined shape using a foam resin, with a covering material made of a woven fiber fabric or a natural or synthetic leather, or the like. For example, when, after the cushion body has been molded into the desired shape, the covering material is made to cover the surface of the resulting cushion body and is secured, a combination of male surface fasteners with a plurality of hook-shaped engagement elements and female surface fasteners with a plurality of loop portions capable of engaging with the hook-shaped engagement elements is used as a means of securing the surface of the cushion body to the back surface of the covering material.

A surface fastener (a molded surface fastener) obtained by molding a thermoplastic resin typically has a plate-shaped base portion (a base material portion), and a plurality of hook-shaped male engagement elements disposed upright on one surface of the base portion. When manufacturing a cushion body that has such a molded surface fastener integrally attached to its surface, the molded surface fastener is first held in a predetermined position on the cavity surface of the die, and then the cushion body is foam-molded in the die with the molded surface fastener set in place. It is thus possible to manufacture a cushion body to which a molded surface fastener is made to adhere in a state where the hook-shaped engagement elements are exposed.

In a case where a molded surface fastener is attached to a cushion body as described above, in order to improve the adhesion strength of the molded surface fastener with respect to the cushion body, Japanese Unexamined Patent Application Publication No. H9-308509 (Patent Document 1) and the specification of U.S. Patent Publication No. 2017/0245602 (Patent Document 2), for example, disclose techniques for joining a back member such as fiber fabric or non-woven fabric to the second surface (the back surface) of the molded surface fastener.

For example, Patent Document 1 discloses a molded surface fastener 100 of which a back member 102 is partially joined using a joint portion 103 to a second surface of a base portion 101, as illustrated in FIG. 13. By using only the joint portion 103 to partially join the back member 102 in this manner, the flexibility of the molded surface fastener 100 is ensured, thus making it difficult for cracks to form in the base portion 101.

Patent Document 2 further discloses a molded surface fastener 110 in which a back member 112 is partially joined to a second surface of a base portion 111, and in which a space section 113 is formed between the second surface of the base portion 111 and the back member 112, as illustrated in FIG. 14. In this molded surface fastener 110 of Patent Document 2, the attachment of the molded surface fastener 110 to the cushion body is reinforced by introducing part of the cushion body into the space section 113 provided between the base portion 111 and the back member 112.

CITATION LIST

Patent Documents

Patent Document 1: Japanese Unexamined Patent Application Publication No. H9-308509.
Patent Document 2: Specification of U.S. Patent Publication No. 2017/0245602

SUMMARY OF INVENTION

Technical Problem

However, in the case of the molded surface fasteners disclosed in Patent Document 1 and Patent Document 2, because the back member is attached using a partial joint portion to the base portion of the molded surface fastener, the region in which the base portion is joined to the back member is small in comparison with a case where the back member is joined to the whole of the second surface of the base portion, for example. This means that, for example, in a case where a cushion body with an integrated molded surface fastener is covered with a covering material and the loop portions of the covering material is engaged with the molded surface fastener, there has been a risk of the back member of the molded surface fastener becoming detached from the base portion when the molded surface fastener is pulled under the tension of the covering material or the like, and, as a result, of the molded surface fastener itself also peeling off from the cushion body.

The invention was conceived in view of the foregoing problem and an object of the invention is to provide a molded surface fastener and a manufacturing method for manufacturing the molded surface fastener that make it possible to maintain the secured state of the back member with respect to the base portion more stably by securing the back member to the base portion more firmly.

Solution to Problem

In order to achieve the foregoing object, the molded surface fastener provided by the invention includes: a fastener member made of a synthetic resin; and a back member formed separately from the fastener member, in which the fastener member has a plate-shaped base portion provided with a first surface and a second surface, and a plurality of engagement elements provided to the first surface of the base portion, and the back member is secured to the second surface of the base portion, said molded surface fastener being principally characterized in that the back member has a structure enabling the synthetic resin to pass from the first surface to the second surface of the back member or a structure enabling the synthetic resin to penetrate into the back member, the base portion has a first base region of a predetermined thickness and a second base region formed to be thicker than the first base region, and the back member is secured to at least the second base region of the base portion.

In the molded surface fastener according to the invention, the dimension of the second base region in the thickness direction is preferably set smaller than the dimension of the engagement elements in the thickness direction from the first surface of the base portion.

In the molded surface fastener according to the invention, the back member is preferably held in a non-secured state with respect to the first base region.

Further, the second base region preferably has a certain thickness along the longitudinal direction of the base portion.

Note that at least one of a recess and a protrusion may also be provided to the second base region.

The molded surface fastener according to the invention is preferably configured such that the fastener member includes left and right outer wall portions disposed upright along the longitudinal direction of the base portion, the left and right outer wall portions are arranged on the outside, in the width direction, of the region where the plurality of engagement elements are formed, and the second base region is formed in a region on the outside of the left and right outer wall portions with respect to the width direction of the base portion.

Next, a method for manufacturing a molded surface fastener provided by the invention is a method for manufacturing a molded surface fastener, said method using a molding device having a die wheel which rotates in one direction and a nozzle portion which supplies a molten synthetic resin to the die wheel to manufacture the molded surface fastener that includes a fastener member made of a synthetic resin and a back member that is formed separately from the fastener member, in which the fastener member has a plate-shaped base portion provided with a first surface and a second surface, and a plurality of engagement elements provided to the first surface of the base portion, and the back member is secured to the second surface of the base portion, said method being principally characterized by including: molding the engagement elements and the base portion in which a first base region having a predetermined thickness is formed by the outer circumferential surface portion of the rotating die wheel; molding a securing protruding portion, which is protruded continuously along the longitudinal direction on the second surface of the base portion; supplying the back member to the second surface of the base portion; and using a pressing roller disposed at a predetermined interval from the die wheel to press at least part of the securing protruding portion while pushing the back member toward the base portion, thus forming a second base region which is formed to be thicker than the first base region and securing the back member to the second base region.

According to this method for manufacturing a molded surface fastener, the nozzle portion preferably includes: a wheel-facing surface that is disposed at a predetermined interval from the outer circumferential surface of the die wheel and that forms the base portion together with the outer circumferential surface of the die wheel; and at least one recessed groove portion recessed into the wheel-facing surface, and securing protruding portion preferably is formed by causing the synthetic resin to flow into the recessed groove portion.

Furthermore, according to the invention, the pressing roller preferably presses, by its outer circumferential surface which is formed flat, the securing protruding portion.

Note that the pressing roller may press, by its outer circumferential surface where at least one of a recess and a protrusion is formed, the securing protruding portion.

Advantageous Effects of Invention

The molded surface fastener according to the invention has a fastener member obtained by molding a synthetic resin; and a flexible back member that is pre-formed separately from the fastener member. The fastener member has a thin, plate-shaped base portion provided with a first surface and a second surface that are oriented on opposite sides from each other in the front-back direction; and a plurality of hook-shaped engagement elements disposed upright on the first surface of the base portion.

The base portion of the fastener member has: a first base region that is formed with a predetermined thickness within a certain range in the width direction of the base portion in a cross-sectional view of the fastener member perpendicular to the longitudinal direction; and a second base region that is disposed within a range in the width direction different from the first base region and that is formed to be thicker than the first base region. A step is provided between the first base region and second base region. In this case, the first base region is continuously formed spanning the entire longitudinal direction of the base portion.

The back member of the invention has a structure enabling synthetic resin to pass from the first surface to the second surface of the back member, like a mesh material or the like, or a structure enabling the synthetic resin to interpenetrate to the back member from the first surface or second surface, like a non-woven fabric. Further, the back member is held to the second surface of the base portion as a result of at least part of the back member being secured so as to be embedded in at least the second base region of the base portion. Here, cases where part of the back member is embedded in the second base region include a case where the back member is embedded in a state of being visible from the second surface of the base portion and a case where the back member is embedded so as to not be visible from the second surface of the base portion.

In the case of the molded surface fastener of the invention, which has a back member attached to the thick second base region of the base portion as described above, the adhesion strength of the back member to the fastener member is increased in comparison with a conventional molded surface fastener as disclosed in Patent Documents 1 and 2, for example, enabling the back member to be held more firmly by the base portion. Thus, even when the back member is pulled away from the fastener member, for example, the back member can be made difficult to peel off from the base portion of the fastener member, and the secured state of the back member can be maintained more stably than with a conventional molded surface fastener.

With this kind of molded surface fastener of the invention, the thickness dimension (the dimension in the thickness direction) of the second base region is set smaller than the thickness dimension of the engagement elements from the first surface of the base portion, and preferably set smaller than half the thickness dimension of the engagement elements from the first surface of the base portion. Accordingly, an increase in the material costs and a reduction in the flexibility of the molded surface fastener due to the provision of a second base region are suppressed while effectively enabling an increase in the adhesion strength of the back member to the fastener member.

The back member of the invention is held in a non-secured state with respect to the first base region. Because the back member is thus not made to adhere to the first base region, the flexibility of the molded surface fastener can be appropriately ensured. In this case in particular, a gap is preferably provided between the back member and the first base region by arranging the back member to be spaced apart from the first base region. Accordingly, when the molded surface fastener is integrated with a cushion body in a cushion-body foam molding process, part of the foam resin of the cushion body can be made to penetrate between the back member and the first base region, and consequently, the adhesion strength of the molded surface fastener with respect to the cushion body can be increased. Note that, according to the invention, the back member may be partially or entirely secured to the first base region.

Furthermore, according to the invention, the second base region of the base portion has a certain thickness along the longitudinal direction of the base portion (the dimension of the base portion in the thickness direction from the first surface to the second surface). Accordingly, the back member can be secured stably to the base portion along the longitudinal direction, and the aforementioned gap can be provided stably between the back member and the first base region.

Note that, according to the invention, at least one of a recess and a protrusion may also be provided to the second base region of the base portion. In this case, a recess or a protrusion may also be formed at regular intervals in the longitudinal direction of the base portion, and a recess and a protrusion may also be formed alternately in the longitudinal direction of the base portion, for example, in the second base region of the base portion.

By forming at least one of a recess and a protrusion in the second base region in this manner, the back member is secured to the second base region when the thickness of the second base region changes in the longitudinal direction of the base portion, thus enabling a large area for securing the back member to the second base region to be secured or enabling part of the back member to be embedded inside the base portion of the second base region. Hence, the adhesion strength of the back member with respect to the fastener member can be more effectively increased. Furthermore, in the case of a molded surface fastener in which the thickness of the second base region changes in the longitudinal direction because the second base region has at least one of a recess and a protrusion, the flexibility of the molded surface fastener can be increased in comparison with a case where the second base region has a certain thickness dimension along the longitudinal direction, for example.

Further, according to the invention, the fastener member has left and right outer wall portions disposed upright along the longitudinal direction of the base portion, the left and right outer wall portions being arranged on the outside, in the width direction, of the region where the plurality of engagement elements are formed. In this case, the second base region of the base portion is preferably formed in a region on the outside of the left and right outer wall portions with respect to the width direction of the base portion.

Accordingly, because a wide gap formed between the back member and the first base region can be secured in an inner region disposed between the left and right outer wall portions in the width direction, the adhesion strength of the molded surface fastener with respect to the aforementioned cushion body, and in particular the adhesion strength of the molded surface fastener in the region where the plurality of engagement elements are formed can be increased more effectively, and as a result, the covering material can be more stably fastened to the cushion body.

Further, because the second base region is formed in the foregoing region, a reduction in the flexibility of the molded surface fastener due to the second base region can be suppressed. In addition, in a case where the left and right outer wall portions provided to the molded surface fastener are subjected to a flattening process in which a pair of upper and lower rollers are used to flatten the upper end surface of the outer wall portions (or a pressing process to press the upper ends of the outer wall portions), for example, the effect of the second base region on the processing accuracy of the flattening process (or the pressing process) can be diminished, and the left and right outer wall portions can be stably molded into a predetermined shape and size.

Next, the method for manufacturing a molded surface fastener according to the invention is a method for manufacturing a molded surface fastener that, by using a molding device having a die wheel which rotates in one direction and a nozzle portion which supplies a molten synthetic resin to the die wheel, manufactures a molded surface fastener that has a fastener member made of a synthetic resin in which a plurality of engagement elements are disposed upright on a plate-shaped base portion, and a back member that is secured to the base portion of the fastener member. According to said method, first the engagement elements and the base portion, which is formed with a first base region of a predetermined thickness, are molded on the outer circumferential surface portion of the rotating die wheel by causing molten synthetic resin to flow out of the nozzle portion. Furthermore, a securing protruding portion, which is disposed upright continuously along the longitudinal direction, is molded on a second surface of the base portion. In addition, according to the manufacturing method of the invention, the back member is supplied to the second surface of the molded base portion. Note that when the back member is supplied to the base portion, the second surface of the base portion may be in a state where the securing protruding portion has been molded or in a state before the securing protruding portion is molded.

Subsequently, by using a pressing roller disposed at a predetermined interval from the die wheel, at least part of the securing protruding portion is pressed while pushing the back member toward the base portion, thus extending, so as to thin, the securing protruding portion and forming a second base region, and the back member is secured to the second base region so as to embed at least part of the back member. At such time, the second base region is formed to be thicker than the first base region.

According to this manufacturing method of the invention, a first base region of a predetermined thickness and a second base region formed to be thicker than the first base region can be stably formed on the base portion of the fastener member, and because the back member can be firmly attached to the second base region of the base portion, the molded surface fastener of the invention can be manufactured stably with the back member firmly held to the base portion as described earlier.

In the manufacturing method of the invention, the nozzle portion has a wheel-facing surface disposed at a predetermined interval from the outer circumferential surface of the die wheel and at least one recessed groove portion recessed into the wheel-facing surface. The base portion is molded between the outer circumferential surface of the die wheel and the wheel-facing surface of the nozzle portion, and a securing protruding portion is formed by causing synthetic resin to flow into and fill the recessed groove portion of the nozzle portion.

Accordingly, before securing the back member, it is possible to stably manufacture a primary fastener member (a provisional fastener member) that has a base portion, a plurality of engagement elements, and a securing protruding portion provided protrudingly to the second surface of the base portion. Moreover, the primary fastener member can be created by making a simple improvement such as the provision of a recessed groove portion to the nozzle portion of a conventionally used molding device, thus curbing any increase in equipment costs associated with improvements.

According to the invention, the pressing roller presses the securing protruding portion via its outer circumferential surface which is formed flat. It is thus possible to easily manufacture a molded surface fastener in which the second base region of the base portion has a certain thickness along the longitudinal direction of the base portion.

Furthermore, the pressing roller may also press the securing protruding portion via its outer circumferential surface which is formed with at least one of a recess and a protrusion using a recess or a protrusion process such as a recessed-groove process or an embossing process. Due to this configuration, the molded surface fastener provided with at least one of a recess and a protrusion can be easily manufactured in the second base region of the base portion.

DESCRIPTION OF EMBODIMENTS

A preferred embodiment of the invention will be described in detail with embodiment examples hereinbelow and with reference to the appended drawings. Note that the invention is not limited to or by the embodiment described hereinbelow; rather, a variety of modifications are possible as long as the configuration is substantially the same as the invention and similar operations and effects are achieved. For example, according to the invention, the length and width dimensions of the molded surface fastener, as well as the quantity, positions, and density of the engagement elements provided on the molded surface fastener, are not subject to any particular limitations and can be optionally modified.

Example 1

Figure 1:
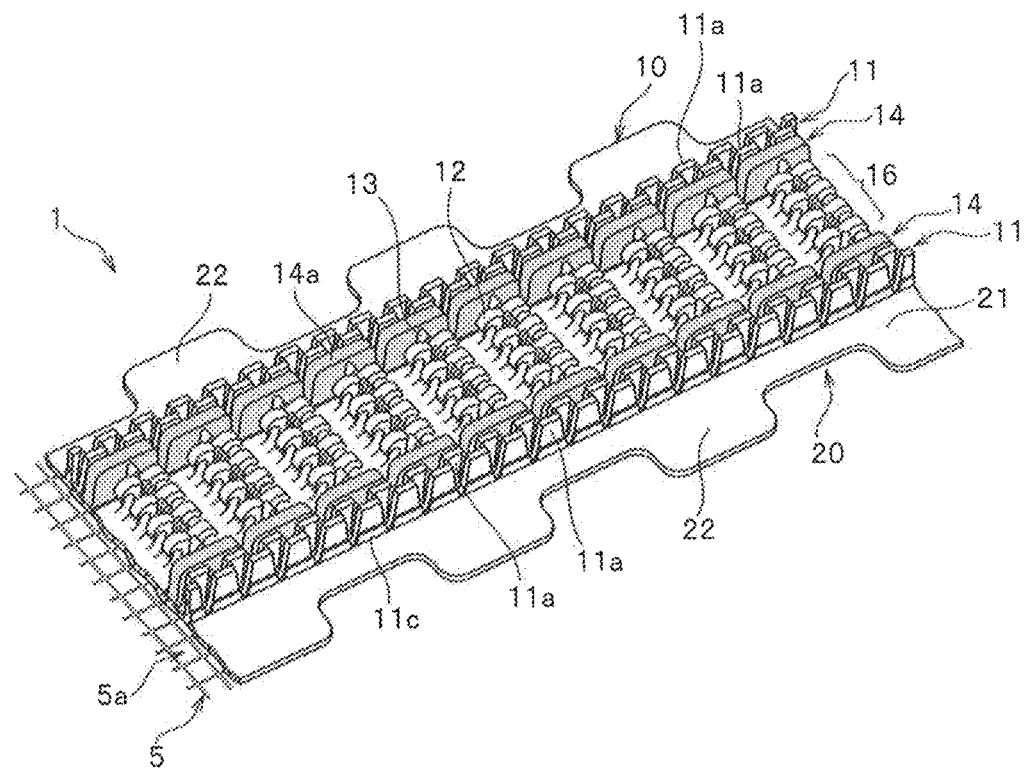
FIG. 1 is a perspective view of a molded surface fastener according to an Example 1 of the invention.
Figure 2:
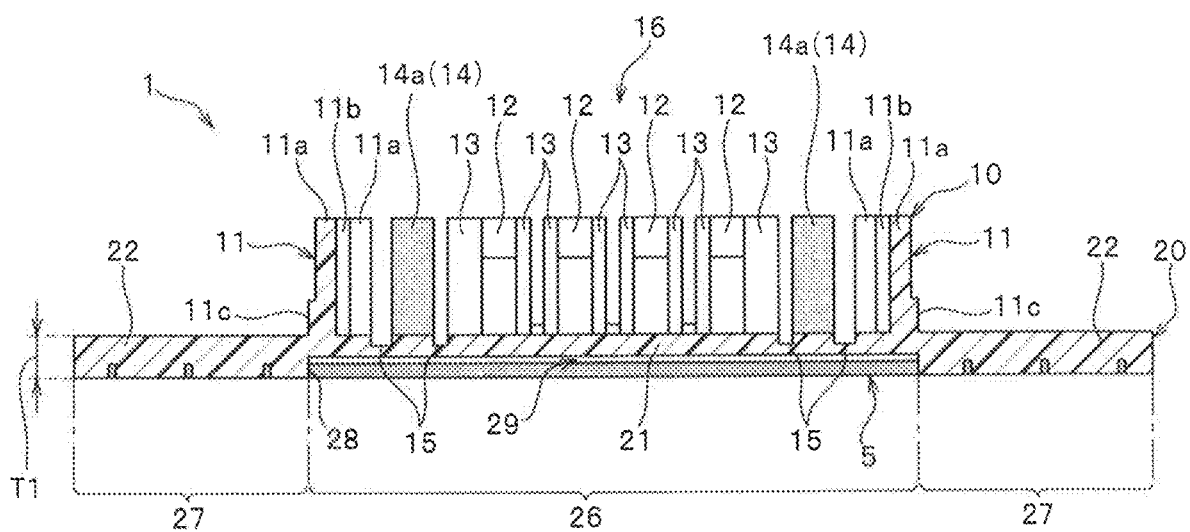
FIG. 2 is a cross-sectional view of a cross-section perpendicular to the longitudinal direction of the molded surface fastener illustrated in FIG. 1.
Figure 3:
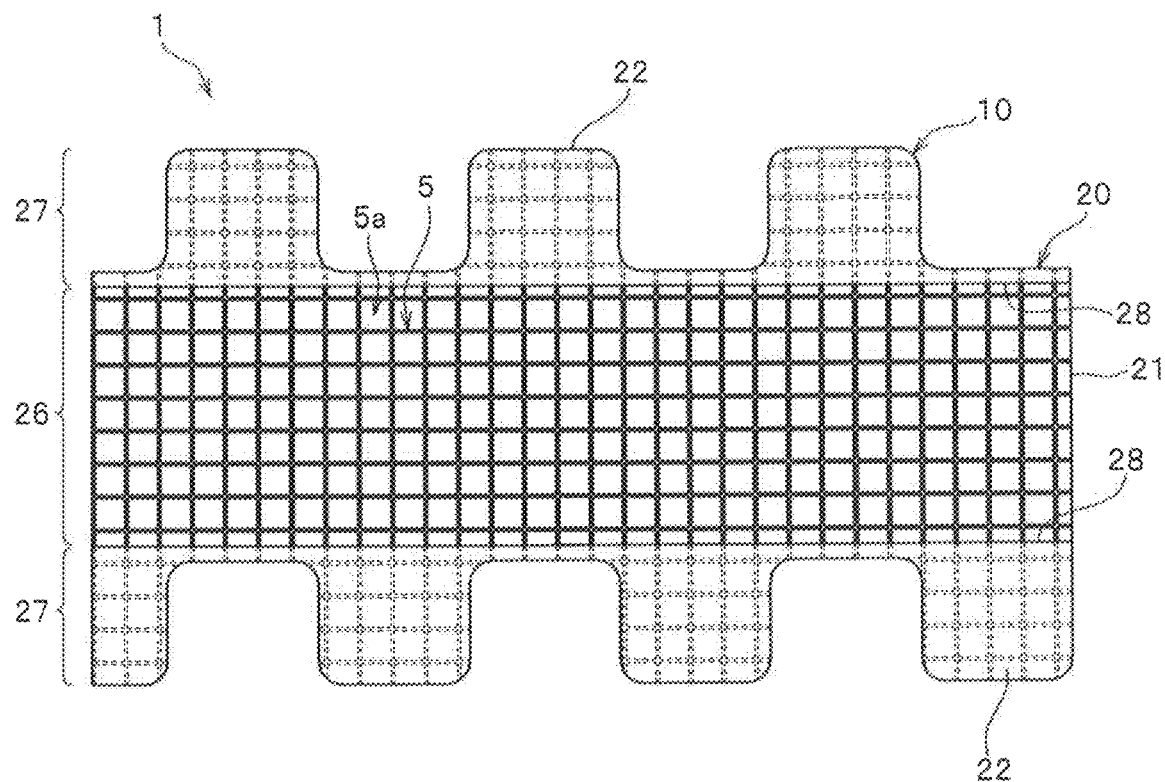
FIG. 3 is a bottom view in which the molded surface fastener illustrated in FIG. 1 is viewed from below.

FIG. 1 is a perspective view of a molded surface fastener according to this Example 1. FIGS. 2 and 3 are a cross-sectional view and a bottom view of the molded surface fastener. Here, in FIG. 3 and the subsequently described FIGS. 8 and 9, the part of the back member that is embedded in the base portion of the fastener member is represented by a dashed line to make it easier to understand the features of the invention. Note that, in the case of a molded surface fastener that is actually manufactured, the back member may be visible even when embedded in the base portion of the fastener member.

Furthermore, in the description hereinbelow, the front-back direction of the molded surface fastener refers to the longitudinal direction of the molded surface fastener (the longitudinal direction of the base portion in particular) which is molded to be long as will be described subsequently, and is a direction along a machine direction (MD) along which the molded surface fastener is continuously molded in the process for molding the molded surface fastener.

The left-right direction refers to a width direction that is perpendicular to the longitudinal direction and that runs along the upper surface (or lower surface) of the base portion of the molded surface fastener. In this case, the left-right direction and the width direction may also be called the cross direction (CD) which is perpendicular to the machine direction (MD). The up-down direction (the thickness direction) refers to a height direction that is perpendicular to the length direction and that is perpendicular to the upper surface (or lower surface) of the base portion of the molded surface fastener; in particular, the direction on the side where the engagement elements are formed on the base material portion is upward, and the direction on the opposite side is downward.

Figure 4:
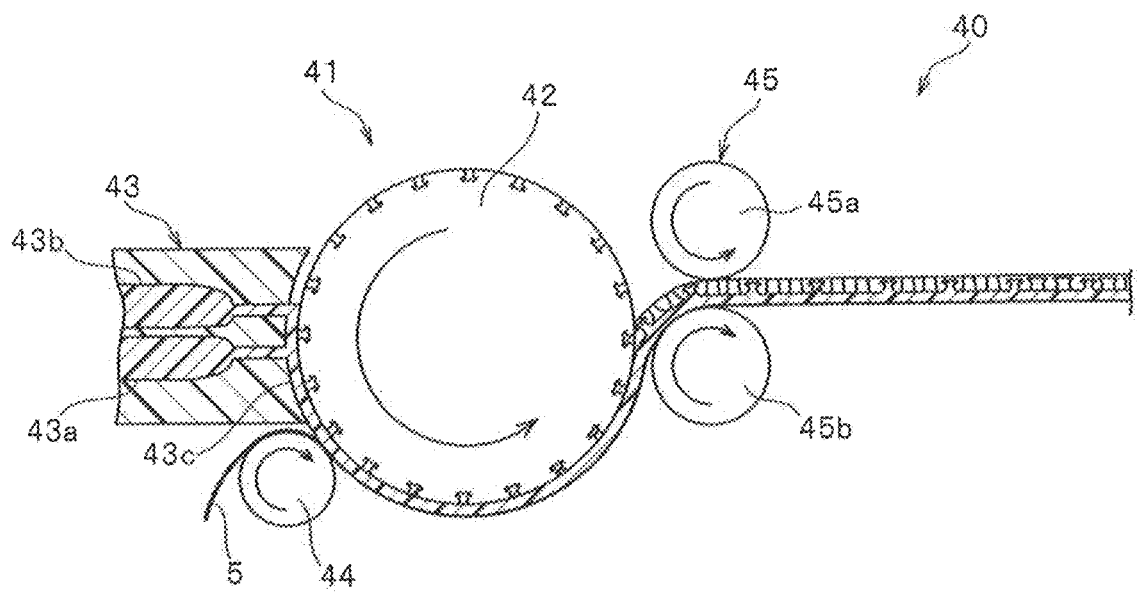
FIG. 4 is a schematic view schematically representing a molded surface fastener manufacturing device.

The molded surface fastener 1 according to this Example 1 has a fastener member 10 made of a synthetic resin which is formed to be long in the front-back direction, and a back member 5 that is partially secured to and held by the second surface (lower surface) of the fastener member 10. The molded surface fastener 1 is manufactured using a manufacturing device 40, described subsequently, which is illustrated in FIG. 4, and is formed to be long in the machine direction (MD) along the conveyance path of the manufacturing device 40.

The fastener member 10 of the molded surface fastener 1 has a thin, plate-shaped base portion 20 that is formed to be long in the front-back direction; left and right outer wall portions 11 that are disposed upright on the left and right lateral edges of the base portion 20; a plurality of male engagement elements 12 arranged between the left and right outer wall portions 11; lateral wall portions 13 arranged along the left-right direction; and left and right magnetic wall portions 14 that are arranged adjacent to the inside of the left and right outer wall portions 11 and that contain magnetic particles.

In this case, the fastener member 10 is formed by melting and integrating a first synthetic resin that contains substantially no magnetic particles and a second synthetic resin that contains a certain percentage of magnetic particles. According to the invention, although the material properties of the first and second synthetic resins are not particularly limited, a thermoplastic resin such as a polyamide resin, a polyester resin, a polypropylene resin, a PVC resin, an ABS resin, a polyethylene resin, or a copolymer of these resins, for example, may be adopted as the first synthetic resin.

Furthermore, the second synthetic resin is made of a thermoplastic resin such as a polyamide resin, a polyester resin, a polypropylene resin, a PVC resin, an ABS resin, a polyethylene resin, or a copolymer of these resins and is formed containing (mixed with) magnetic particles consisting of an alloy of iron, cobalt, nickel, or the like in a predetermined ratio. According to the invention, magnetic particles refer to particles that produce magnetism when a magnetic field is applied to the particles, and the material properties of the magnetic particles are not particularly limited as long as the material is magnetically attracted to the magnet. The particle size of each magnetic particle and the average particle size can also be optionally modified.

Note that, in FIGS. 1 and 2 of this Example 1, the part of the fastener member 10 which contains magnetic particles is depicted using a gray color. Moreover, in the molded surface fastener 1 that is actually manufactured, the part formed by the synthetic resin can be colored using the desired color (green, for example) by adding pigments and the like to the synthetic resin.

The base portion 20 of the fastener member 10 has a base body portion 21 that supports the left and right outer wall portions 11 and the plurality of engagement elements 12, and a plurality of fin strips 22 that extend, like tongues, outward in the width direction from the left and right lateral edges of the base body portion 21. The left and right fin strips 22 are arranged at different angles in the longitudinal direction of the base portion 20.

The fin strips 22 are parts of the cushion body that are embedded inside the cushion body when same is foam molded, and are provided to increase the adhesion strength of the molded surface fastener 1 to the cushion body. According to the invention, the shape, size, and installation pattern, and so forth, of the fin strips are not particularly limited. The fastener member may also be formed without providing the fin strips.

On the first surface (upper surface) of the base portion 20 in this Example 1, the left and right outer wall portions 11, the plurality of engagement elements 12, the left and right magnetic wall portions 14, and the plurality of lateral wall portions 13 are disposed upright, and recessed groove portions 15 are recessed along the length direction on both the left and right sides of each magnetic wall portion 14.

Furthermore, the base portion 20 of this Example 1 has a first base region 26 formed with a thickness dimension of a predetermined size between the first surface (upper surface) and the second surface (lower surface) of the base portion 20; and left and right second base regions 27 to which the back member 5 is secured and formed having a thickness dimension of a predetermined size that is larger than that of the first base region 26 between the upper and lower surfaces of the base portion 20.

In this case, the upper surface of the first base region 26 and the upper surfaces of the second base regions 27 are provided at the same height position (position in the up-down direction) in the fastener member 10. On the other hand, a step 28 is provided between the lower surface of the first base region 26 and the lower surfaces of the second base regions 27. Here, the upper surface of the base portion 20 refers to the surface (the flat surface in particular) which is exposed above the part of the base portion 20 where the aforementioned outer wall portions 11, engagement elements 12, magnetic wall portions 14, lateral wall portions 13, and the recessed groove portions 15 of the fastener member 10 are not formed.

The lower surface of the base portion 20 (in particular the lower surface of the first base region 26) may also have localized sink marks (dents) caused by shrinkage of the synthetic resin, but these sink marks are extremely small. For this reason, according to the invention, in a case where the base portion has a sink mark due to shrinkage, the change in the thickness dimension of the base portion 20 caused by the sink mark is included in the error range.

In other words, even when, for example, a sink mark is produced in the lower surface of the first base region 26 and part of the lower surface is locally depressed to a small size, the sink mark is not recognized as a recess according to the invention, and the lower surface of the first base region 26 is regarded as a flat surface, including the part in which the sink mark is produced. Note that, when a sink mark is produced in the lower surface of the first base region 26, the step 28 between the lower surface of the first base region 26 and the lower surfaces of the second base regions 27 is made larger than the depth of the sink mark in the thickness direction (up-down direction).

The first base region 26 of the base portion 20 is disposed sandwiched between the left and right second base regions 27 in the center section of the base portion 20 in the width direction. In this case, the boundary positions between the first base region 26 and the second base regions 27 (that is, the positions of the steps 28) relative to the width direction of the fastener member 10 are set in the fastener member 10 width direction (the left-right direction) so as to correspond to positions on the outer surfaces of the left and right outer wall portions 11 facing outward in the width direction. In other words, the first base region 26 of the base portion 20 is formed continuously, relative to the width direction of the fastener member 10, in the range from a position on the outer surface of the left outer wall portion 11 to a position on the outer surface of the right outer wall portion 11.

The thin-walled first base region 26 is provided in the foregoing range, thus making it easier to ensure appropriate flexibility of the fastener member 10. In addition, when the molded surface fastener 1 is integrated into the cushion body, the penetration of foam resin on the side of second surface of the region where the engagement elements 12 are formed (that is, an engagement region 16 of the molded surface fastener 1) enables an increase in the adherence strength between the molded surface fastener 1 and the cushion body, as described subsequently. It is thus possible to stabilize the position of the region of the cushion body where the engagement elements 12 are formed (the engagement region 16). As a result, when the foam-molded cushion body is covered with the covering material and the loop portions of the covering material are made to engage with the engagement elements 12, the covering material can be stably fastened in a predetermined position on the cushion body.

Furthermore, the left and right second base regions 27 are formed, relative to the width direction of the fastener member 10, within a range further outside than the positions of the outer surfaces of the left and right outer wall portions 11 and so as to span this whole outside range. This configuration enables the back member 5 to be firmly secured at the left and right lateral edges of the fastener member 10, making it difficult for the back member 5 held by the fastener member 10 to sag. Note that, according to the invention, the left and right second base regions 27 may also be formed only in part of the range outside the left and right outer wall portions 11.

In addition, in the manufacturing process for the molded surface fastener 1, as described subsequently, for example, after the back member 5 is secured to the molded fastener member 10, the left and right outer wall portions 11 of the fastener member 10 are sometimes subjected to a flattening process using a pair of upper and lower rollers (an upper pinching roller 45*a* and a lower pinching roller 45*b*, described subsequently). In this case, during the flattening process of the manufacturing process, due to the difference in thickness between the first and second base regions 26 and 27 (the thickness dimension of the step 28), the outer wall portions 11 are prevented from being pressed hard locally or from deforming the engagement elements 12, the magnetic wall portions 14, or the lateral wall portions 13, and these parts can be formed stably with a predetermined shape and size.

In this Example 1, the first base region 26 and the second base regions 27 of the base portion 20 are formed continuously along the length direction of the base portion 20, each having a certain thickness dimension. The back member 5 is not secured to the first base region 26, as illustrated in FIG. 2, and is held in an exposed state on the lower side of the molded surface fastener 1.

In the case of this Example 1 in particular, the back member 5 is disposed spaced apart from the first base region 26, and a small gap 29 is formed continuously along the front-back direction between the lower surface of the first base region 26 and the back member 5. Note that, according to the invention, the back member 5 may be partially or entirely secured to the lower surface of the first base region 26.

In the second base regions 27, the back member 5 is secured in a state of being embedded in the base portion 20. Note that the back member 5 in the second base regions 27 is embedded in the base portion 20 but is not covered by the synthetic resin of the base portion 20, and hence the back member 5 is secured so as to be visible in a bottom view of the molded surface fastener 1.

In this case, as illustrated in FIG. 2, the thickness dimension of the second base regions 27 (the dimension in the thickness direction from the first surface to the second surface of the second base regions 27) T1 is set to 1.1 times or more, preferably 1.3 times or more, the thickness dimension of the first base region 26. Further, the thickness dimension T1 of the second base regions 27 is set smaller than the thickness dimension of the engagement elements 12 from the first surface of the base portion 20, and preferably set smaller than half the thickness dimension of the engagement elements 12 from the first surface of the base portion 20.

Note that the respective thickness dimensions of the first base region 26 and the second base regions 27 can be optionally selected depending on the application of the molded surface fastener 1 or on the material properties and thickness, and so forth, of the back member 5 to be secured to the fastener member 10. For example, in the molded surface fastener 1 of this Example 1, the specific thickness dimension of the first base region 26 is preferably set 0.1 mm or more and 2.5 mm or less, and in particular 0.15 mm or more and 1.0 mm or less. The specific thickness dimension of the second base regions 27 is preferably in a range of 0.15 mm or more and 3.0 mm or less and in particular in a range of 0.2 mm or more and 2.5 mm or less, and is preferably formed thicker than the first base region 26.

The thickness dimension of the first base region 26 is 0.1 mm or more, as mentioned earlier, to appropriately secure the strength of the fastener member 10. Furthermore, the thickness dimension of the second base regions 27 is 0.15 mm or more, thus enabling the back member 5 to be firmly secured to the second base region 27, and increasing the adherence strength of the back member 5 to the fastener member 10. On the other hand, the thickness dimension of the first base region 26 is 2.5 mm or less, and the thickness dimension of the second base region 27 is 3.0 mm or less, thus enabling the flexibility of the molded surface fastener 1 to be appropriately maintained and curbing an increase in material costs.

Furthermore, the base portion 20 is preferably formed so that the difference between the thickness dimension of the first base region 26 and the thickness dimension of the second base regions 27 (the size of the step 28 between the first base region 26 and the second base regions 27) is larger than the thickness dimension of the back member 5 (in particular, the maximum thickness dimension of the back member 5). This configuration makes it easier to hold the back member 5 in a state of non-adherence to the first base region 26 of the base portion 20. At the same time, the aforementioned gap 29 can be easily provided between the back member 5 secured to the base portion 20 and the lower surface of the first base region 26 of the base portion 20. For example, in the case of this Example 1, the step 28 between the first base region 26 and the second base regions 27 is preferably 0.05 mm or more and 2.5 mm or less.

The left and right outer wall portions 11 of the fastener member 10 are provided along the front-back direction in an area further inward from the proximal-end position of the fin strips 22 of the base portion 20 (in positions on the left and right lateral edges of the base body portion 21). The left and right outer wall portions 11 are provided as resin penetration-preventing wall portions that prevent foam resin from penetrating into the engagement region 16 where the plurality of engagement elements 12 are arranged from the outside in the width direction, when the cushion body is foam-molded.

The left and right outer wall portions 11 in this Example 1 each have two rows of vertical wall rows 11*a* formed in parallel in the length direction, a connecting wall portion 11*b* that connects between the divided vertical wall portions of these two rows of vertical wall rows 11*a*, and a reinforcing portion 11*c* that is provided on the outer wall surface side of the vertical wall rows 11*a* arranged on the outside in the width direction. Each vertical wall row 11*a* has a plurality of divided vertical wall portions, each of which is arranged in a row along the length direction and intermittently at a predetermined formation pitch. The plurality of divided vertical wall portions forming the two vertical wall rows 11*a* are entirely arranged in a staggered manner. The upper surface (top end surface) of each divided vertical wall portion is formed into a flat surface that is orthogonal to the height direction.

The height dimension (the dimension in the up-down direction) from the upper surface of the base portion 20 of each divided vertical wall portion of the vertical wall rows 11*a* and each connecting wall portion 11*b* is set to the same size as the maximum value of the height dimension of the engagement elements 12 from the upper surface of the base portion 20, and is also set to the same size as the height dimension of the magnetic wall portions 14 from the upper surface of the base portion 20 to the upper surfaces of the magnetic wall portions 14.

The plurality of engagement elements 12 formed in the fastener member 10 are disposed upright with a predetermined formation pitch in the length and width directions so as to obtain a predetermined binding force (engagement force) with the covering material with which the cushion body is covered. In the case of this Example 1 in particular, the engagement elements 12 are arranged in a row with a predetermined formation pitch along the length direction, and the vertical rows of the engagement elements 12 are arranged in four rows in the width direction.

In this Example 1, the region between the left and right magnetic wall portions 14 where the plurality of engagement elements 12 are arranged is defined as the engagement region 16. Note that, according to the invention, there are no particular limitations on the arrangement pattern of the engagement elements 12. For example, the engagement region 16 may also be formed by arranging the plurality of engagement elements 12 in a predetermined arrangement pattern such as in a staggered manner between the left and right magnetic wall portions 14, or by randomly arranging them, and so forth. Furthermore, there are no particular limitations on the shape or dimensions of each of the engagement elements 12, which can be optionally modified.

The lateral wall portion 13 of the fastener member 10 is integrally formed, in continuity with the engagement elements 12, on both the left and right sides of each of the engagement elements 12. Further, the lateral wall portions 13 of this Example 1 include a first lateral wall portion that is provided along the width direction between engagement elements 12 adjacent to each other in the width direction and that has a small width dimension (width direction dimension); and a second lateral wall portion that is provided along the width direction from the engagement elements 12 adjacent to the magnetic wall portions 14 toward the magnetic wall portions 14 and that has a larger width dimension than the first lateral wall portion. Further, between the two first lateral wall portions that are arranged adjacent to each other, there is a reinforcing lateral wall portion that connects the lower ends of the two first lateral wall portions together, and a slit (a space section) formed above the reinforcing lateral wall portion.

The height dimension of the lateral wall portions 13 from the upper surface of the base portion 20 is set to the same size as the maximum value of the height dimension of the engagement elements 12 from the upper surface of the base portion 20, and is also set to the same size as the height dimension of the outer wall portions 11 from the upper surface of the base portion 20. Thus, when the molded surface fastener 1 is brought into close contact with the cavity surface of the die as will be described subsequently, the foam resin of the cushion body can be prevented from penetrating beyond the outer wall portions 11 and into the engagement region 16 from the width direction. At the same time, the foam resin can also be prevented from penetrating the engagement region 16 from the longitudinal direction beyond the lateral wall portions 13 and the engagement elements 12. Note that the embodiments of the outer wall portions 11, the engagement elements 12, and the lateral wall portions 13 of the invention are not limited to the embodiments described in this Example 1; other embodiments may also be adopted as long as same enable the penetration of foam resin to be prevented.

The left and right magnetic wall portions 14 each are arranged between the outer wall portions 11 and the engagement region 16 relative to the width direction of the fastener member 10, and are provided in a linear manner along the length direction. Furthermore, the left and right magnetic wall portions 14 each have a plurality of magnetic wall bodies 14a that are intermittently arranged along the length direction and that have a substantially trapezoidal shape in a lateral view. The magnetic wall bodies 14a each contain magnetic particles like those mentioned earlier. Further, on both the left and right sides of each magnetic wall portion 14, a pair of left and right recessed groove portions 15, which are continuously recessed in a linear manner along the length direction, are arranged adjacent to the magnetic wall portions 14 on the upper surface portion of the base portion 20. Note that, in the invention, instead of forming magnetic wall portions 14 containing magnetic particles as mentioned earlier, it is also possible to form a molded surface fastener by securing a magnetic member such as a monofilament containing powder or particles of iron or the like, for example, in a predetermined position, and thus the molded surface fastener can be attracted to a fastener holding portion of a cushion body-molding die (described subsequently) by using the magnetic force of a magnet.

The back member 5 that is secured to the fastener member 10 of this Example 1 is formed from a flexible mesh material (mesh-like fabric) 5 having synthetic fibers arranged in a lattice shape, and the mesh material 5 itself is flexible and can be easily bent. In this case, the thickness of the mesh material 5 (the dimension of the mesh material 5 from one surface (first surface) to the other surface (second surface)) is not particularly limited; however, in the case of this Example 1, the thickness of the mesh material 5 is preferably 0.05 mm or more and 2.5 mm or less. Alternatively, the thickness of the mesh material 5 is preferably smaller than the thickness of the base portion 20.

Further, the mesh material 5 has openings (voids) 5a formed between the lattice-shaped synthetic fibers that enable the synthetic resin forming the fastener member 10 to circulate from the first surface to the second surface of the mesh material 5 in a molten state when the fastener member 10 is molded. Furthermore, the mesh material 5 is formed so as to enable the foam resin to pass through the mesh material 5 via the openings (voids) 5a when the cushion body is foam-molded.

Note that, in this Example 1, the material properties, structure, size of the openings (voids), and so forth, of the mesh material 5 are not particularly limited, and an optional mesh material can be selected as long as the molten synthetic resin or foam resin is able to pass through the interior.

The mesh material (the back member 5) of this Example 1 is secured to the second base region 27 of the base portion 20 as mentioned earlier, and is held apart from the first base region 26 of the base portion 20 such that the gap 29 is formed. Furthermore, the openings 5a formed between the synthetic fibers of the mesh material 5 are filled with and blocked by the synthetic resin forming the second base region 27. In this case, the second surface of the synthetic resin with which the openings 5a is filled and the second surface formed by the synthetic fibers of the mesh material 5 are formed into a single, continuous flat surface.

According to the invention, the back member 5 that is secured to the fastener member 10 has a structure that allows the synthetic resin forming the fastener member 10 to pass from the first surface to the second surface in a molten state, or a structure that allows the synthetic resin forming the fastener member 10 to penetrate the first or second surface in a molten state, and the structure may be flexible.

Thus, in addition to the foregoing mesh material 5, a textile fabric, textile knitted fabric, non-woven fabric, or synthetic resin film having the foregoing structure, or the like, for example, can also be used as the back member 5 of the invention. In particular, when a non-woven fabric is used for the back member 5, it is preferable that the non-woven fabric be intentionally provided with thick and thin parts, or that the non-woven fabric be intentionally provided with openings (voids) through which molten synthetic resin or foam resin is capable of passing.

Figure 5:
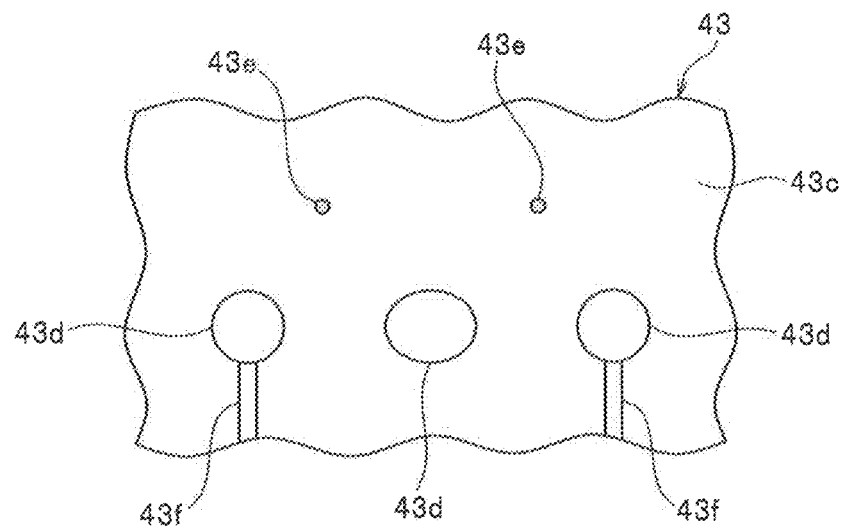
FIG. 5 is a schematic view schematically representing a nozzle portion disposed in the manufacturing device.

The molded surface fastener 1 of Example 1, which has the foregoing configuration, is manufactured using the manufacturing device 40 illustrated in FIGS. 4 and 5, for example.

The manufacturing device 40 of this Example 1 has a molding device 41 illustrated in FIG. 4 and a cutting device (not illustrated) which is disposed downstream of the molding device 41.

The molding device 41 of this Example 1 includes a die wheel 42 that drives and rotates in one direction (a counterclockwise direction in the drawing); a nozzle portion 43 that is disposed opposite the outer circumferential surface of the die wheel 42 and that supplies, separately and continuously, molten first synthetic resin and second synthetic resin; a back member supply portion (not illustrated) that continuously supplies the back member 5 to the outer circumferential surface of the die wheel 42 in a position further downstream in the direction of rotation (forward in the machine direction) of the die wheel 42 than the nozzle portion 43; a pressing roller 44 that presses the securing protruding portion 31 of the primary fastener member 30 while pushing the back member 5 toward the primary fastener member 30 (described subsequently); and a pickup roller 45 disposed further downstream in the direction of rotation of the die wheel 42 than the pressing roller 44.

The die wheel 42 of the molding device 41 is formed with a cylindrical shape. Although omitted from the drawing, the die wheel 42 has a plurality of stacked plates formed in the shape of a ring or donut of a required thickness, and a rotating shaft portion that is inserted into the central opening in the plurality of overlapping stacked plates and that secures the stacked plates.

In the outer circumferential surface portion of the die wheel 42 (that is, the outer periphery of the stacked plates), molding cavities (not illustrated) for molding the outer wall portions 11, the engagement elements 12, the lateral wall portions 13, and the magnetic wall portions 14 of the molded surface fastener 1 are formed using conventionally known techniques such as electrical discharge machining, laser machining, and etching.

In this case, the stacked plates forming the die wheel 42 have a plurality of first stacked plates of which the dimension in the radial direction has a certain size, and four second stacked plates having a larger radial dimension than the first stacked plates and that are used to form the recessed groove portions 15 in the fastener member 10.

Furthermore, although omitted from the drawing, the die wheel 42 of this Example 1 is formed to enable a cooling liquid to pass inside the die wheel 42 in order to efficiently cool the fastener member 10 molded on the outer peripheral surface portion of the die wheel 42. A cooling liquid tank (not illustrated), in which the lower half of the die wheel 42 is immersed, is disposed at the bottom of the die wheel 42.

As illustrated in FIG. 4, formed in the nozzle portion 43 are: a first flow channel 43*a* for enabling passage, in a molten state, of a first synthetic resin that does not substantially contain magnetic particles; and a second flow channel 43*b* for enabling passage, in a molten state, of a second synthetic resin that contains magnetic particles at a certain concentration.

As illustrated in FIGS. 4 and 5, the nozzle portion 43 has a wheel-facing surface (base-forming surface) 43*c* that is disposed opposite the die wheel 42 and that forms the second surface of the base portion 20 of the fastener member 10; a plurality of first supply ports 43*d*, which are provided on the wheel-facing surface 43*c* and that discharge the molten first synthetic resin; a plurality of second supply ports 43*e*, which are provided on the wheel-facing surface 43*c* and that discharge the molten second synthetic resin; and two molding recessed groove portions 43*f*, which are recessed along the machine direction (MD) into the wheel-facing surface 43*c*.

The wheel-facing surface 43*c* of the nozzle portion 43 is formed into a smooth, curved surface with no (or a small degree of) unevenness so as to form a certain interval between the wheel-facing surface 43*c* and the curved outer circumferential surface of the die wheel 42, said interval corresponding to the thickness dimension of the foregoing first base region 26 in the fastener member 10. The first supply ports 43*d* and the second supply ports 43*e* are circular or elliptical openings in the wheel-facing surface 43*c*, respectively, and are connected to the first flow channel 43*a* and the second flow channel 43*b*, respectively, in the nozzle portion 43.

The left and right molding recessed groove portions 43*f* are each formed continuously in a linear manner on the wheel-facing surface 43*c*, along the machine direction from the first supply ports 43*d*. Each molding recessed groove portion 43*f* is formed such that the cross-section perpendicular to the machine direction has a substantially U-shaped outline. In this case, the surface area of the foregoing cross-section of the molding recessed groove portions 43*f* is approximately the same as the surface area represented by the product of the difference in thickness dimension between the first base region 26 and the second base region 27 and the maximum value of the dimension in the width direction of the left or right second base region 27 of the fastener member 10 being manufactured.

Note that, according to the invention, the position, shape, size, and so forth of the first and second supply ports 43*d* and 43*e* of the nozzle portion 43 can be optionally changed according to the size, form, and so forth of the molded surface fastener to be molded. The position, size, and cross-sectional shape of the molding recessed groove portions 43*f* can be optionally changed according to the position, size, shape, and so forth of the securing protruding portion provided to the primary fastener member. The molding recessed groove portions 43*f* need not be formed so as to be directly connected to the first supply ports 43*d*, as per this Example 1.

The pressing roller 44 is arranged so as to form a certain interval between the outer circumferential surface of the pressing rollers 44 and the outer circumferential surface of the die wheel 42, corresponding to the thickness dimension of the above second base region 27 in the fastener member 10. The outer circumferential surface (cylindrical surface) of the pressing roller 44 in this Example 1 is formed into a smooth, flat, curved surface with no (or a small degree of) unevenness.

The pickup roller 45 has a pair of upper and lower pinching rollers 45*a* and 45*b* that sandwich the molded surface fastener 1 from above and below along the outer circumferential surface of the die wheel 42. The upper pinching roller 45*a* and the lower pinching roller 45*b* of the pickup roller 45 are arranged facing each other at a predetermined interval.

These upper and lower pinching rollers 45*a* and 45*b* each rotate at a predetermined speed in a predetermined direction, thus enabling the molded surface fastener 1 molded by means of the outer circumferential surface portion of the die wheel 42 to be continuously pulled off the die wheel 42. Furthermore, the pulled-off molded surface fastener 1 can be transported downstream while being sandwiched between the upper and lower pinching rollers 45*a* and 45*b*.

The cutting device (not illustrated) disposed downstream of the molding device 41 has a cutter portion (not illustrated) that can be raised and lowered in the up-down direction. This cutting machine is capable of punching out part of the molded surface fastener 1 being conveyed by lowering the cutter portion toward the molded surface fastener 1, thus forming the foregoing left and right fin strips 22 on the left and right lateral edges of the base portion 20 of the molded surface fastener 1.

When manufacturing the molded surface fastener 1 of Example 1 using the foregoing manufacturing device 40, first, molten first and second synthetic resins are continuously discharged from the first supply port 43d and the second supply port 43e of the nozzle portion 43 toward the die wheel 42. Thereupon, the second synthetic resin is fed between a pair of second stacked plates that have a large radial dimension. By allowing the second synthetic resin to flow between the large second stacked plates in this manner, it is possible to prevent the second synthetic resin from leaking beyond the set of second stacked plates.

Figure 6:
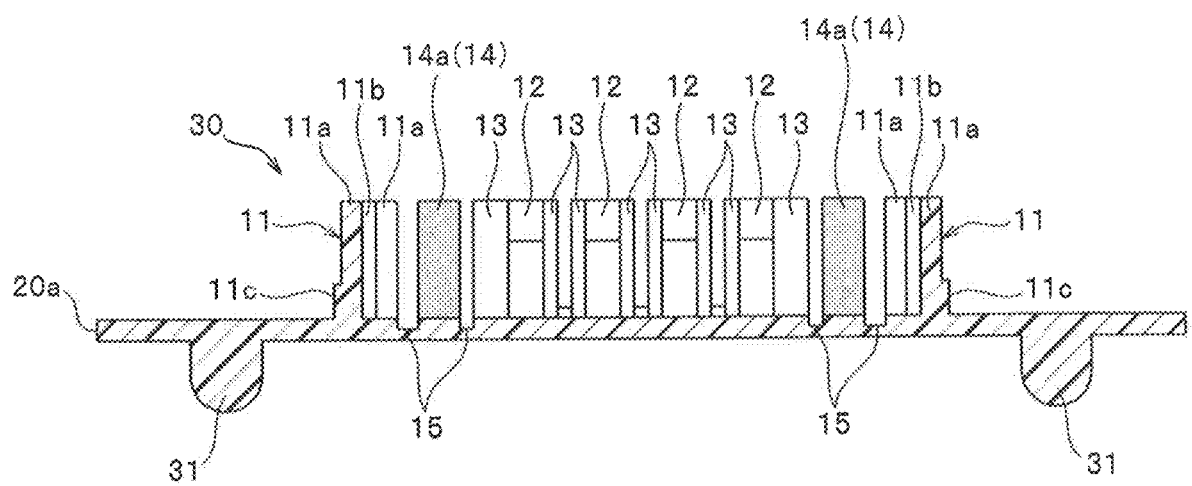
FIG. 6 is a cross-sectional view of a primary fastener member before the back member formed by the manufacturing device is secured.
Figure 7:
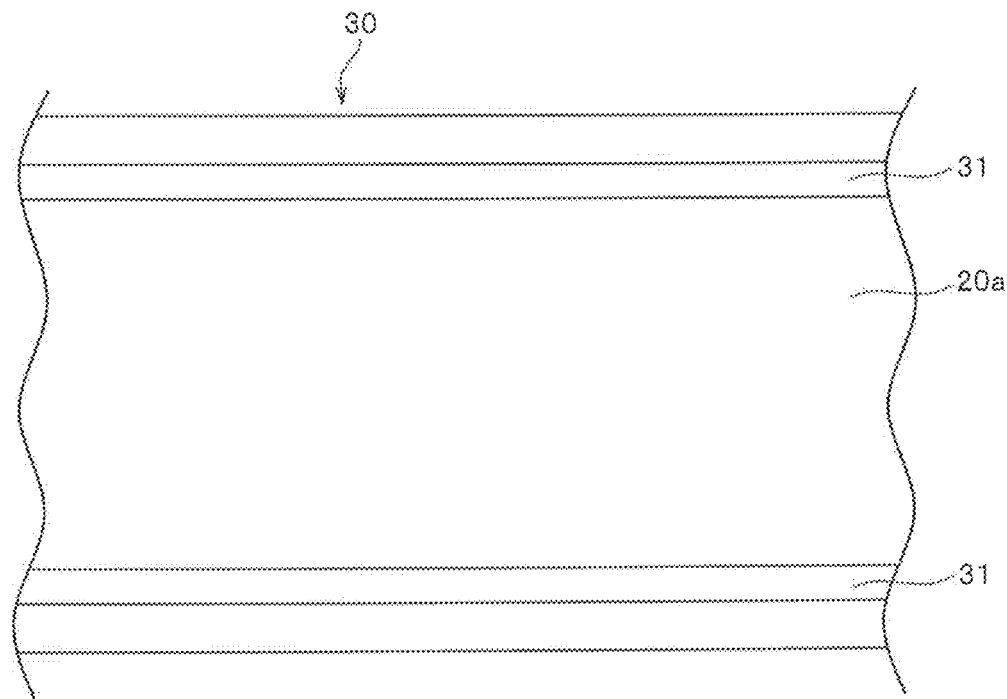
FIG. 7 is a bottom view in which the primary fastener member illustrated in FIG. 6 is viewed from below.

Furthermore, as the molten first and second synthetic resins are supplied from the first supply port 43d and the second supply port 43e, the two types of molten first and second synthetic resins mix together at the boundary between the resins, and the primary fastener member (the provisional fastener member) 30 as illustrated in FIGS. 6 and 7 is formed on the outer circumferential surface portion of the die wheel 42.

This primary fastener member 30 has a base portion (a primary base portion) 20a that is molded between the nozzle portion 43 of the molding device 41 and the die wheel 42, and outer wall portions 11, engagement elements 12, lateral wall portions 13, magnetic wall portions 14, and recessed groove portions 15 that are molded by means of each cavity formed on the outer circumferential surface portion of the die wheel 42. At this time, the base portion 20a molded between the nozzle portion 43 and the die wheel 42 has a certain thickness dimension (the dimension in the up-down direction) over the entire width direction, except for the recessed groove portion 15 of the base portion 20a.

The first base region 26 (that is, the first base region 26 of a predetermined thickness) of the fastener member 10 is formed in the base portion 20a, and the second surface of the left and right lateral edges of the base portion 20a is provided with left and right securing protruding portions 31 that protrude downward.

The left and right securing protruding portions 31 formed at this time are formed by the left and right molding recessed groove portions 43f, respectively, provided to the nozzle portion 43. In this case, each of the left and right securing protruding portions 31 is formed in a position where the second base region 27 can be formed in a predetermined range as mentioned earlier when the securing protruding portions 31 are pressed by the pressing roller 44, as will be described subsequently. The left and right securing protruding portions 31 are each formed so that the surface area of the cross-section perpendicular to the longitudinal direction of each securing protruding portion 31 is approximately the same size as the surface area represented by the product of the difference in thickness dimension between the first base region 26 and the second base region 27 of the fastener member 10 being manufactured and the maximum value of the dimension in the width direction of the second base region 27 on the left or right side.

For example, in this Example 1, the left and right securing protruding portions 31 are each formed so that the height dimension (the dimension in the height direction) of the securing protruding portions 31 from the second surface of the base portion 20a is larger than half the height dimension of the engagement elements 12 from the first surface of the base portion 20a and smaller than the height dimension of the engagement elements 12 from the first surface of the base portion 20a. The maximum value of the width dimension (in the left-right or cross direction (CD)) of the left and right securing protruding portions 31 is larger than the width dimension of the engagement elements 12 and less than three times the width dimension of the engagement elements 12. The position, shape, width dimension, and height dimension of the securing protruding portions 31 can be optionally changed according to the thickness and range of the second base region 27 to be molded.

In this Example 1, the base portion 20a of the primary fastener member 30 that is molded by means of the outer circumferential surface portion of the die wheel 42 does not have the left and right fin strips 22 that the fastener member 10 includes, and the base portion 20a of the primary fastener member 30 is formed with a certain width dimension (the dimension in the left-right direction) between the left and right lateral edges of the base portion 20a.

In the manufacturing method of this Example 1, as illustrated in FIG. 4, while molding the foregoing primary fastener member 30 by means of the outer circumferential surface portion of the die wheel 42, the back member (the mesh material) 5 is supplied from the back member supply portion (not illustrated) toward the second surface of the base portion 20 in said primary fastener member 30. In this Example 1, the back member 5 supplied from the back member supply portion is conveyed while being brought into contact with the outer circumferential surface portion of the rotating pressing roller 44, and is fed to the second surface of the base portion 20 in a position further downstream in the direction of rotation of the die wheel 42 (forward in the machine direction) than the nozzle portion 43.

The primary fastener member 30 and the back member 5 are then fed, overlapping each other, between the die wheel 42 and the pressing roller 44. At such time, the pressing roller 44 presses the back member 5 against the base portion 20a of the primary fastener member 30, while pressing, toward the base portion 20a, the two securing protruding portions 31 that protrude from the second surface of the base portion 20a, thus extending, so as to thin, the securing protruding portions 31. Accordingly, the fastener member 10 is manufactured by forming a second base region 27, which is thicker than the foregoing first base region 26, at the left and right lateral edges of the base portion 20.

At the same time, the supplied back member 5 is secured to the second base region 27, which is formed to a predetermined thickness by means of the pressing roller 44, so as to be embedded in the lower surface of the second base region 27, and the lower surface of the second base region 27 to which the back member 5 is secured is flattened. Depending on the manufacturing conditions, the back member 5 may be crushed through the pressing by the pressing roller 44 together with the securing protruding portion 31, thus embedding and securing the synthetic fibers of the back member 5 so that same are entangled in the synthetic resin of the second base region 27.

Thus, the back member 5 is firmly secured to the second base region 27 through the pressure of the pressing roller 44, thus enabling continuous formation along the machine direction (MD) of the molded surface fastener 1, the back member 5 of which is held to the second surface of the fastener member 10. At such time, the molded surface fastener 1 thus formed is cooled by half-rotating while being carried by the outer circumferential surface portion of the die wheel 42.

The molded surface fastener 1, which has been cooled using the outer circumferential surface portion of the die wheel 42, is then continuously pulled off the die wheel 42 by the pickup roller 45 and introduced between the upper pinching roller 45a and the lower pinching roller 45b of the pickup roller 45.

When the molded surface fastener 1 is made to pass between the upper pinching roller 45a and the lower pinching roller 45b, the outer wall portions 11, the engagement elements 12, the lateral wall portions 13, and the magnetic wall portions 14 are sandwiched between the rotating upper pinching roller 45a and lower pinching roller 45b, along with the base portion 20. Hence, the height dimensions of each of the outer wall portions 11, the engagement elements 12, the lateral wall portions 13, and the magnetic wall portions 14 from the base portion 20 can be aligned to be the same size as each other, and the upper surfaces of the outer wall portions 11, the lateral wall portions 13, and the magnetic wall portions 14 can be flattened by means of the outer circumferential surface of the upper pinching roller 45a.

In particular in the case of the molded surface fastener 1 of this Example 1, the left and right second base regions 27 of the base portion 20 are formed in the width direction of the fastener member 10, as mentioned earlier, within a range outside the positions of the outer surfaces of the left and right outer wall portions 11, and the outer wall portions 11, the engagement elements 12, the lateral wall portions 13, and the magnetic wall portions 14 are formed only within the range of the thin first base region 26 of the base portion 20.

For this reason, when the molded surface fastener 1 is introduced between the upper pinching roller 45a and lower pinching roller 45b of the pickup roller 45 to perform the foregoing flattening process (including the alignment of the height dimensions), the flattening process is not affected (or made difficult) by the difference in thickness between the first base region 26 and the second base region 27 of the base portion 20, and the flattening of the outer wall portions 11, the engagement elements 12, the lateral wall portions 13, and the magnetic wall portions 14 can be performed stably. Thus, the upper surfaces of the outer wall portions 11, the lateral wall portions 13, and the magnetic wall portions 14 can be each arranged on a single plane, and the problem of the outer wall portions 11 being excessively crushed by the pickup roller 45, for example, thus causing significant deformation of the outer wall portions 11, or the problem of the height dimension of the outer wall portions 11 being made smaller than that of the magnetic wall portions 14 can be prevented. In the invention, the foregoing flattening process to flatten the outer wall portions 11, the engagement elements 12, and the like can also be performed by installing a pair of upper and lower pressing rollers further downstream of the pickup roller 45, separately from the pickup roller 45 installed in this Example 1.

Next, after passing through the pickup roller 45, the molded surface fastener 1 is conveyed to the cutting machine (not illustrated), where the cutter portion of the cutting machine performs a cutting process to partially punch out left and right lateral edge portions of the base portion 20 of the molded surface fastener 1. Accordingly, the molded surface fastener 1 of this Example 1, which is illustrated in FIG. 1, is manufactured by forming left and right fin strips 22 on the base portion 20 of the molded surface fastener 1.

The molded surface fastener 1 thus manufactured is then transported to a cutting unit (not illustrated), for example, and cut to a predetermined length in the cutting unit and collected, or the molded surface fastener 1 is rolled onto a collection roller or the like while remaining in its long form.

By following the above process, the molded surface fastener 1 of this Example 1 illustrated in FIG. 1 can be manufactured in a stable manner. In the case of the molded surface fastener 1 thus manufactured, the back member 5 is held to the base portion 20 of the fastener member 10 with a high adhesion strength, and a gap 29 that enables the foam resin of the cushion body to enter is formed between the first base region 26 of the base portion 20 and the back member 5.

The molded surface fastener 1 in this Example 1 is then integrated in a predetermined position on the cushion body (foam) of an automobile seat or the like, for example, at the same time as the cushion body is being foam-molded. The foam molding of the cushion body will now be described in simple terms.

Although omitted from the drawing, the die used to mold the cushion body has, for example, a lower die (fixed die), an upper die (movable die), and an injection nozzle for injecting foam resin material into the cavity space in the upper and lower dies. The die is also equipped with at least one fastener holding portion where the molded surface fastener 1 is placed and held, and a magnet capable of attracting the magnetic wall portions 14 on the molded surface fastener 1 is embedded inside or near the fastener holding portion. Note that, according to the invention, the shape and structure of the molding die are not limited and can be optionally modified.

When using this kind of die to foam-mold the cushion body, the molded surface fastener 1, which has been cut to the required length, is placed on the fastener holding portion of the die. As a result, the magnetic wall portions 14 of the molded surface fastener 1 are magnetically attracted by the magnet embedded in the fastener holding portion, thus securing the molded surface fastener 1 to the fastener holding portion. In addition, the upper surfaces of the left and right outer wall portions 11, the upper surfaces of the lateral wall portions 13, and the upper ends of the engagement elements 12 of the molded surface fastener 1 can be brought into close contact with the mounting surface of the fastener holding portion.

Next, foam resin for the cushion body is poured by being injected from the injection nozzle into the cavity space of the die. Accordingly, the foam resin flows while foaming, and the foam molding of the cushion body (foam) takes place. At this time, the molded surface fastener 1 of this Example 1 is in close contact with the fastener holding portion of the die, thus preventing the flowing foam resin from entering the engagement region 16 from the width direction over the left and right outer wall portions 11 of the molded surface fastener 1, and from entering the engagement region 16 from the longitudinal direction over the plurality of lateral wall portions 13 and the plurality of engagement elements 12.

Furthermore, in the molded surface fastener 1 of this Example 1, a small gap 29 is formed between the lower surface of the first base region 26 of the base portion 20 and the back member 5 (see FIG. 2), and the back member 5 is made of a mesh material 5 with openings (voids) 5a that enable the passage of foam resin. Thus, during foam molding, the foam resin is capable of passing through the back member 5 and entering between the first base region 26 of the base portion 20 and the back member 5, and the back member 5 can be embedded and held within the foam resin.

As a result, it is possible to effectively increase the adhesion strength of the molded surface fastener 1 to the cushion body, and in particular the adhesion strength of the molded surface fastener 1 on the back surface (lower surface) side of the area where the engagement region 16 is provided.

When the foam molding process is complete, a cushion body that has the molded surface fastener 1 secured in the required locations is manufactured. In the case of a cushion body thus obtained, the molded surface fastener 1 is firmly secured in a predetermined position, thus making it difficult for the molded surface fastener 1 to peel off from the cushion body. In addition, since the foam does not enter the engagement region 16 of the molded surface fastener 1, the inherent engagement force of the engagement elements 12 can be stably secured.

Thus, when the surface of the resulting cushion body is covered with covering material, the loop portions on the back surface of the covering material can easily be caused to engage with the engagement elements 12 of the molded surface fastener 1. The covering material can thus be fastened in a stable manner without lifting up from the cushion body, thus enabling the covering material to be attached accurately to the surface of the cushion body. Furthermore, since the molded surface fastener 1 is firmly secured to the cushion body, the fastened state of the covering material to the cushion body can be stably maintained.

Example 2

Figure 8:
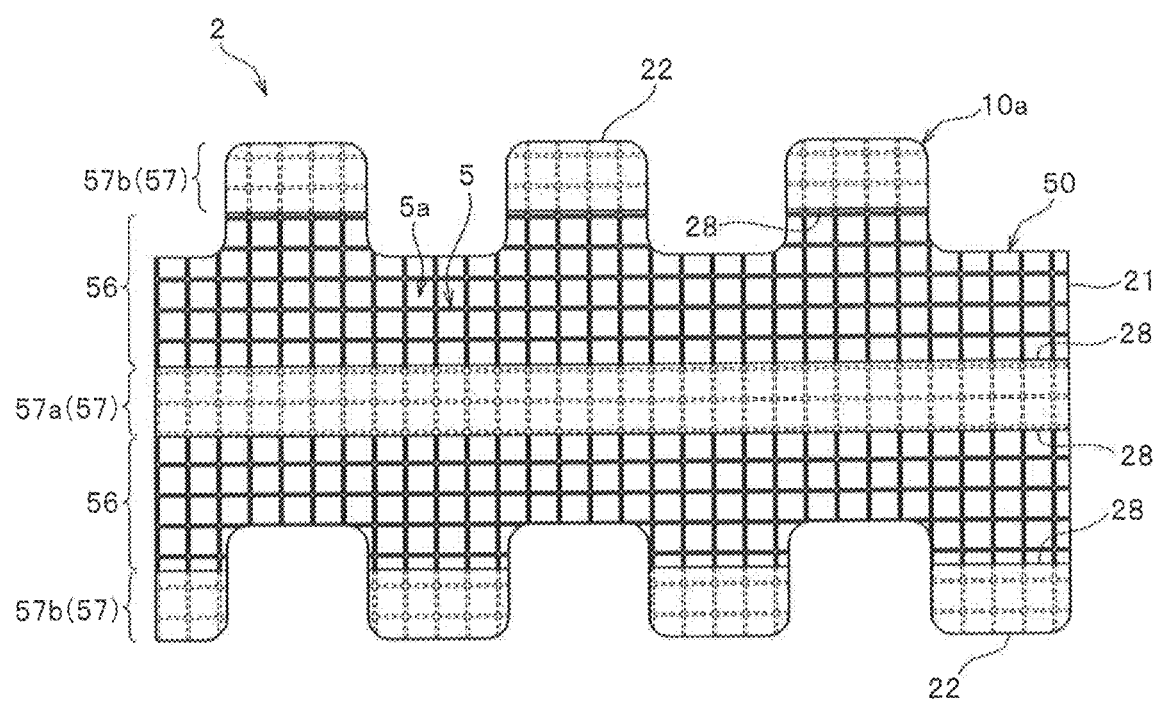
FIG. 8 is a bottom view of a molded surface fastener according to an Example 2 of the invention.

FIG. 8 is a bottom view of a molded surface fastener according to this Example 2. In comparison to the molded surface fastener 1 of the foregoing Example 1, a molded surface fastener 2 according to this Example 2 is formed by modifying the formation positions and formation ranges of the first base region 56 and second base region 57 of a base portion 50 of the fastener member 10*a*, and also by modifying the ranges within which the back member 5 is secured and not secured to a fastener member 10*a*. Note that, according to the invention, the formation positions and formation ranges of the first base region and the second base region of the base portion are not limited and can be optionally modified.

The molded surface fastener 2 of this Example 2 is also formed in the same way as the molded surface fastener 1 of the foregoing Example 1, except for these modifications. Thus, in this Example 2 and in Example 3, which will be described subsequently, members or components that have substantially the same shape and dimensions as the molded surface fastener 1 of the foregoing Example 1 will be denoted using the same reference signs and will not be described.

The molded surface fastener 2 in this Example 2 has a synthetic resin fastener member 10*a* and a back member 5 that is partially secured to and held by the lower surface of the fastener member 10*a*. The fastener member 10*a* also has a plate-shaped base portion 50 and, although omitted from the drawing, left and right outer wall portions 11, a plurality of hook-shaped engagement elements 12, lateral wall portions 13, and left and right magnetic wall portions 14 as per the foregoing Example 1.

The base portion 50 of this Example 2 has a pair of left and right first base regions 56 having a predetermined thickness dimension and a second base region 57 that is larger than the first base region 56 and has a certain thickness dimension. In this case, the left and right first base regions 56 are formed across the base body portion 21 and the fin strips 22 of the base portion 50. In each first base region 56, the back member 5 is held in a non-secured state, and a small gap is provided between the first base region 56 and the back member 5.

The second base region 57 has a central region 57*a* that is provided in the center in the width direction of the base portion 50, and an outer region 57*b* that is on the outside, in the width direction, of the left and right first base regions 56 and is provided to the fin strips 22 of the base portion 50. The back member 5 is secured to the second base region 57 in an embedded state.

The first base region 56 and second base region 57 of the molded surface fastener 2 in this Example 2 have the same thickness dimensions as the first and second base regions 26 and 27 of the molded surface fastener 1 in the foregoing Example 1, respectively, and a step is formed between the lower surface of the first base region 56 and the lower surface of the second base region 57.

The molded surface fastener 2 of this Example 2 as described above is manufactured using the manufacturing device 40 illustrated in FIG. 4. In this Example 2, the molded surface fastener 2 as illustrated in FIG. 8 is manufactured by making the quantity, position, and shape of the molding recessed groove portions formed in the nozzle portion 43 of the molding device 41 different from those of the foregoing Example 1.

In the case of the molded surface fastener 2 of this Example 2 as described above, the back member 5 is firmly secured and held to the base portion 50 of the fastener member 10*a*. A gap which enables the foam resin of the cushion body to enter is also formed between the first base region 56 of the base portion 50 and the back member 5. Thus, by integrating the molded surface fastener 2 of this Example 2 into the cushion body at the same time as the foam molding of the cushion body, the molded surface fastener 2 can be firmly secured in a predetermined position on the cushion body, thus making it difficult for the molded surface fastener 2 to peel off from the cushion body.

Example 3

Figure 9:
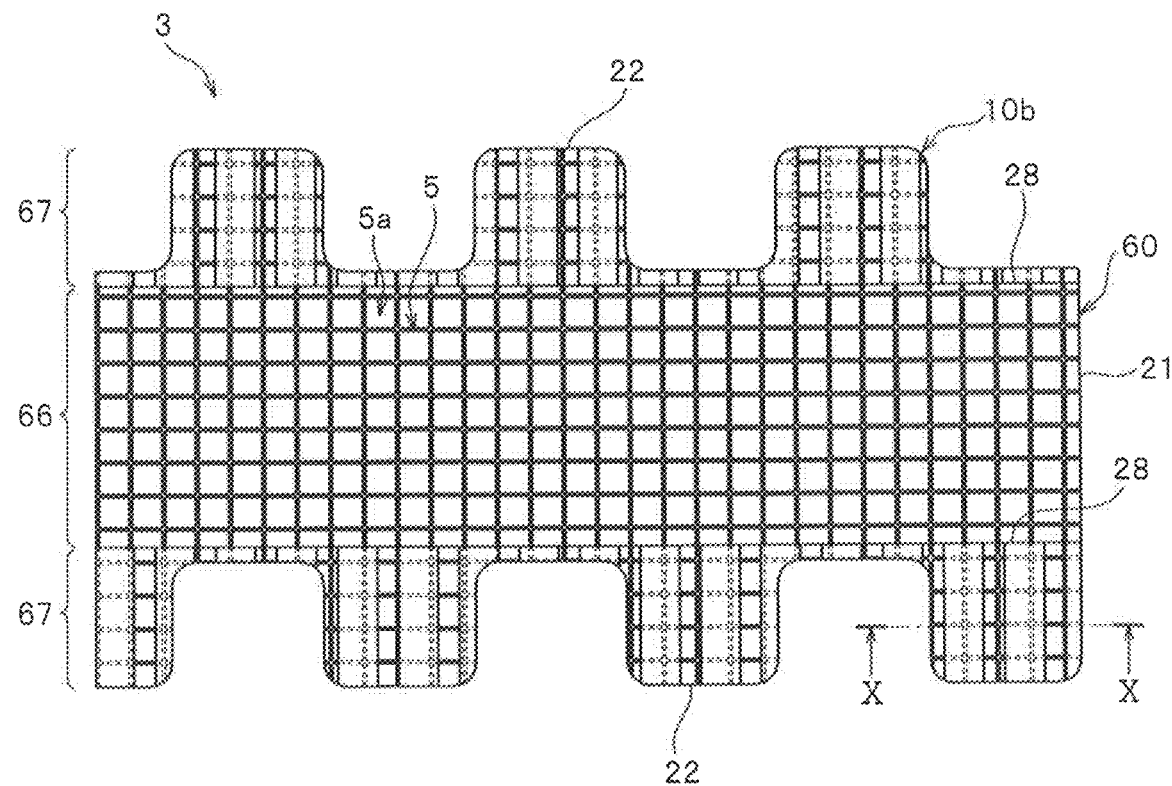
FIG. 9 is a bottom view of a molded surface fastener according to an Example 3 of the invention.
Figure 10:
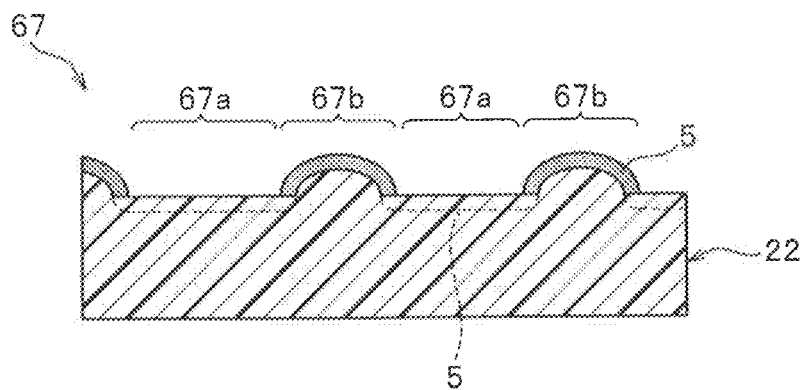
FIG. 10 is a cross-sectional view along line X-X illustrated in FIG. 9.

FIG. 9 is a bottom view of the molded surface fastener according to this Example 3, and FIG. 10 is a cross-sectional view along the X-X line illustrated in FIG. 9.

A molded surface fastener 3 according to this Example 3 is formed in the same way as the molded surface fastener 1 of the foregoing Example 1 in terms of the formation positions and formation ranges of a first base region 66 and a second base region 67 of a base portion 60. However, the shape of the second base region 67 and the secured state of the back member 5 with respect to the second base region 67 are formed differently.

The molded surface fastener 3 in this Example 3 has a synthetic resin fastener member 10*b* and a back member 5 that is partially secured to and held by the lower surface of the fastener member 10*b*. The fastener member 10*b* also has a plate-shaped base portion 60, although omitted from the drawing, as well as left and right outer wall portions 11, a plurality of hook-shaped engagement elements 12, lateral wall portions 13, and left and right magnetic wall portions 14 as per the foregoing Example 1.

The base portion 60 of this Example 3 has a first base region 66 having predetermined thickness dimensions and a pair of left and right second base region 67 having a larger thickness dimension than the first base region 66. The first base region 66 in this Example 3 is formed in the same manner as the first base region 26 of the foregoing Example 1.

Meanwhile, although the second base region 67 in this Example 3 has a larger thickness dimension than the first base region 66, the thickness dimension of the second base region 67 is formed to be partially different.

In specific terms, as illustrated in FIGS. 9 and 10, the second base region 67 in this Example 3 has a flat second base portion 67a that is larger than the first base region 66 and has a predetermined thickness dimension, and a convex second base portion (convex portion) 67b that is formed along the width direction while further increasing the thickness dimension beyond that of the flat second base portion 67a.

Furthermore, the flat second base portion 67a and the convex second base portion 67b are formed with their respective certain length dimensions (dimensions in the front-back direction) oriented in the longitudinal direction of the base portion 60 and are formed alternately. Thus, the convex second base portion 67b is formed at regular intervals in the longitudinal direction of the base portion 60. The flat second base portion 67a in this Example 3 has the same thickness dimension as the second base region 27 of the molded surface fastener 1 in the foregoing Example 1.

Furthermore, in the case of this Example 3, as illustrated in FIGS. 9 and 10, the back member 5 is secured in an embedded position in the flat second base portion 67a of the second base region 67 when the molded surface fastener 3 is viewed from the side, as per the case of the molded surface fastener 1 of the foregoing Example 1. Meanwhile, in the convex second base portion 67b of the second base region 67, the fiber portion of the back member 5 is exposed on the curved lower surface of the convex second base portion 67b and is made to adhere to the curved lower surface.

In this Example 3, the back member 5 is pressed against the base portion 60 by the pressing roller 44 when the back member 5 is relatively soft in the molding process of the fastener member 10b, for example, thus also enabling the back member 5 to be secured by being embedded in the convex second base portion 67b of the second base region 67 in a straight or almost straight shape instead of a curved shape.

This molded surface fastener 3 of Example 3 is manufactured using the manufacturing device 40 illustrated in FIG. 4. However, when the molded surface fastener 3 of this Example 3 is to be manufactured, a roller in which a recess (a recessed groove portion) parallel to the direction of the roller rotation axis is formed at a regular pitch in the outer circumferential surface, rather than a roller of which the outer circumferential surface is formed to be smooth, flat, and curved as per the foregoing Example 1, is used as the pressing roller 44 that presses the securing protruding portion 31 of the primary fastener member 30. Note that, in this Example 3, the molded surface fastener 3 illustrated in FIG. 9 can be manufactured using the same method as the foregoing Example 1, except that the outer peripheral surface shape of the pressing roller 44 is different.

With the foregoing molded surface fastener 3 of this Example 3, the back member 5 can be firmly secured to the base portion 60 of the fastener member 10b with greater adhesion strength than the molded surface fasteners 1 and 2 of the foregoing Examples 1 and 2. Also in this Example 3, a gap, which enables the foam resin of the cushion body to enter between the first base region 66 of the base portion 60 and the back member 5, is provided.

Thus, by integrating the molded surface fastener 3 of this Example 3 into the cushion body at the same time as the foam molding of the cushion body, the molded surface fastener 3 can be firmly secured in a predetermined position on the cushion body, thus making it difficult for the molded surface fastener 3 to peel off from the cushion body.

Note that, in the case of the molded surface fastener 3 of this Example 3, as explained with reference to FIGS. 9 and 10, the second base region 67 of the base portion 60 has a flat second base portion 67a of a predetermined thickness dimension and a convex second base portion 67b which is formed along the width direction. However, in this Example 3, the form of the second base region 67 is not limited to this configuration, and as long as the thickness dimension of the second base region 67 can be made larger than that of the first base region 66 and varied in at least one of the longitudinal and width directions of the base portion 60, it is possible to form the second base region 67 using other embodiments.

For example, as an embodiment of the second base region that is a modification example of this Example 3, the second base region may also be formed to have a flat second base portion having a predetermined thickness dimension, and a recessed groove-shaped second base portion that has a thickness dimension smaller than the flat second base portion and is recessed along the width direction. In this case, the recessed groove-shaped second base portion preferably has a larger thickness dimension than the first base region. The second base region may also be formed to have a recessed groove-shaped second base portion and a convex second base portion which alternate in the longitudinal direction.

Furthermore, as another modification example, the second base region may also be formed having a flat second base portion and a convex second base portion (or a recessed groove-shaped second base portion) which is formed inclined relative to the width direction, or may be formed having a flat second base portion and a convex second base portion (or a recessed groove-shaped second base portion recessed in a twill weave) which protrudes like a diagonal mesh (twill weave).

Even the molded surface fasteners with the second base region described as these modification examples afford the same advantageous effects as the molded surface fasteners described in the foregoing Example 3. Furthermore, when a recessed groove-shaped second base portion is provided to the second base region, for example, because the second base region is formed partially thinner, the flexibility of the molded surface fastener can be increased.

Note that, when molded surface fasteners according to these modification examples are to be manufactured, the molding device 41 is equipped with a pressing roller 44 that has an outer circumferential surface with recesses or protrusions corresponding to the convex or recessed groove-shaped portions to be formed on the second base portion.

The foregoing Examples 1 through 3 describe cases where the molded surface fasteners 1 to 3 are manufactured using the manufacturing device 40 equipped with the molding device 41 illustrated in FIG. 4. However, the device for manufacturing the molded surface fastener of the invention is not limited to such cases. For example, instead of the molding device 41 illustrated in FIG. 4, it is possible to manufacture each of the molded surface fasteners 1 to 3 in Examples 1 to 3 by using the molding device 71 according to the modification example illustrated schematically in FIG. 11 or the molding device 81 according to the modification example illustrated schematically in FIG. 12.

Figure 11:
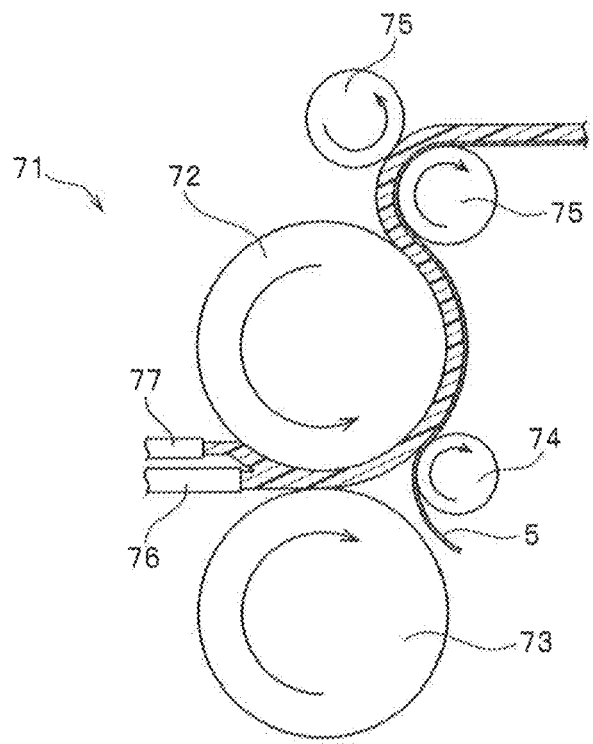
FIG. 11 is a schematic view schematically representing a manufacturing device according to a modification example.

For example, the molding device 71 in the modification example illustrated in FIG. 11 has a die wheel 72 that drives and rotates in one direction (the counterclockwise direction in the drawing); a support roller 73 that drives and rotates in the opposite direction to the die wheel 72 (the counterclockwise direction in the drawing); a first nozzle portion 76 that continuously feeds molten first synthetic resin toward the space between the die wheel 72 and the support roller 73; a second nozzle portion 77 that continuously feeds molten second synthetic resin toward the space between the die wheel 72 and the support roller 73; a back member supply portion (not illustrated) that continuously feeds the back member 5 toward the die wheel 72 at the position after the primary fastener member 30 passes between the die wheel 72 and the support roller 73; a pressing roller 74 that presses the securing protruding portion 31 of the primary fastener member 30 while pushing the back member 5 toward the primary fastener member 30; and a pickup roller 75 disposed further downstream in the direction of rotation of the die wheel 72 than the pressing roller 74.

In this case, the die wheel 72, pressing roller 74, and pickup roller 75 which are illustrated in FIG. 11 have substantially the same structure as the die wheel 42, pressing roller 44, and pickup roller 45 of the molding device 41 which are illustrated in FIG. 4.

The first nozzle portion 76 has a first flow channel for distributing, in a molten state, a first synthetic resin that does not substantially contain magnetic particles, and a plurality of first supply ports for discharging the first synthetic resin from the first flow channel toward the die wheel 72. The second nozzle portion 77 has a second flow channel for distributing, in a molten state, a second synthetic resin containing magnetic particles at a certain content concentration, and a second supply port for discharging the second synthetic resin from the second flow channel toward the die wheel 72.

The support rollers 73 are arranged at a predetermined interval from the die wheel 72. The outer circumferential surface of this support roller 73 is arranged with a wheel-facing surface (base formation surface) that is formed in a smooth curve and that forms the second surface of the base portion, and molding recessed groove portions that are recessed along the machine direction (MD) into the wheel-facing surface. In this case, the molding recessed groove portions are formed in the same cross-sectional shape and size as, for example, the molding recessed groove portions 43f provided to the nozzle portion 43 described in Example 1.

By using this support roller 73 and die wheel 72, for example, the primary fastener member 30 illustrated in FIGS. 6 and 7 can be molded. In other words, the base portion of the primary fastener member 30 is molded by the outer circumferential surface of the die wheel 72 and the wheel-facing surface of the support roller 73, and the securing protruding portion 31 is molded on the second surface of the base portion by the molding recessed groove portions provided to the support roller 73.

Subsequently, as described in Example 1, the back member 5 is supplied to the second surface of the base portion of the primary fastener member 30, and the primary fastener member 30 and the back member 5 are introduced between the die wheel 72 and the pressing roller 74. This configuration makes it possible to form a second base region thicker than the first base region in the base portion and to firmly secure the back member 5 to the second base region.

Thus, the molding device 71 illustrated in FIG. 11 can be used in place of the molding device 41 illustrated in FIG. 4 to mold the molded surface fastener, and furthermore, as in Example 1, can then be conveyed toward a cutting device (not illustrated) to perform a predetermined cutting process to form the fin strips 22. It is thus possible to manufacture the molded surface fastener 1 of Example 1, for example. Similarly, it is also possible to manufacture the molded surface fastener 2 of Example 2 and the molded surface fastener 3 of Example 3 by using the molding device 71.

Figure 12:
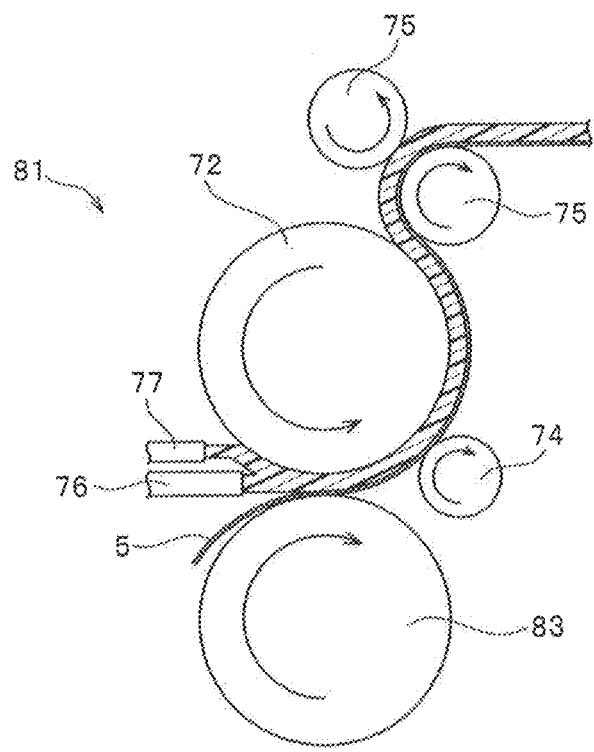
FIG. 12 is a schematic view schematically representing a manufacturing device according to another modification example.
Figure 13:
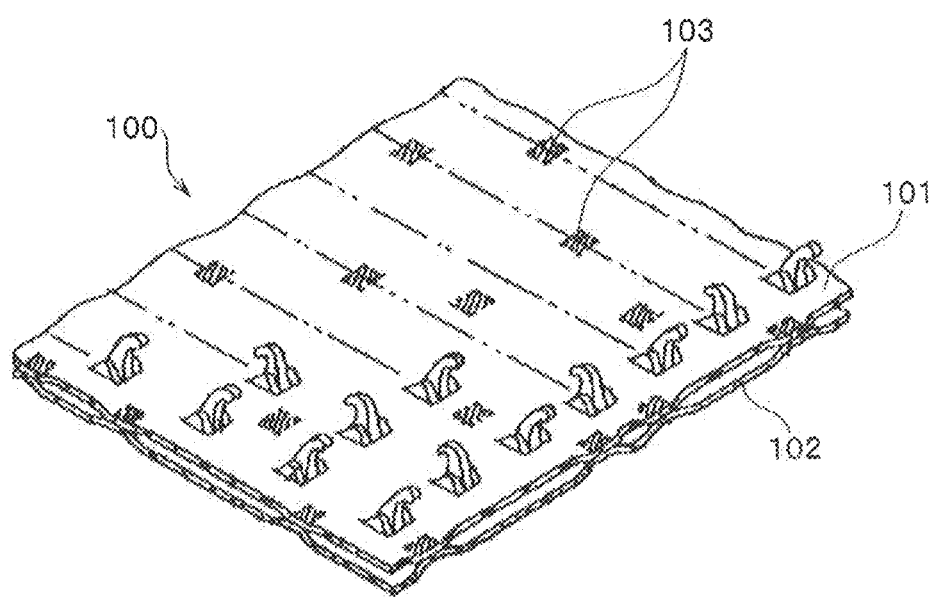
FIG. 13 is a perspective view of a conventional molded surface fastener.
Figure 14:
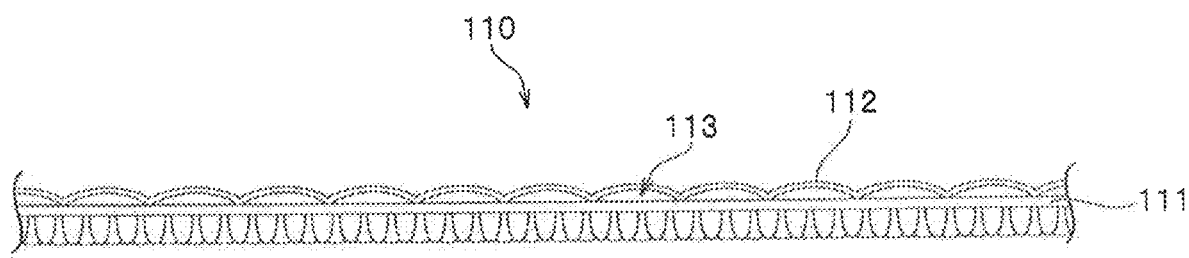
FIG. 14 is a side view of another conventional molded surface fastener.

The molding device 81 of another modification example illustrated in FIG. 12 differs from the molding device 71 illustrated in FIG. 11 in that the position at which the back member 5 is fed from the back member supply portion (not illustrated) to the synthetic resin is set upstream from the position in which the primary fastener member 30 is molded by the die wheel 72 and the support roller 83 and in that the size of the molding recessed groove portions provided to the support roller 83 is increased. However, further embodiments are formed similarly to the molding device 71 illustrated in FIG. 11.

The molding support roller 83 of the molding device 81 molds the base portion of the primary fastener member 30 with the back member 5 interposed between same and the synthetic resin, and also molds the securing protruding portion 31 on the second surface of the base portion by means of the molding recessed groove portions of the support roller 83. Thus, in order to integrally mold the securing protruding portion 31 into the base portion with a predetermined size, the molding recessed groove portions provided to the support roller 83 of the molding device 81 are formed larger than the molding recessed groove portions provided to the support roller 73 of the molding device 71 illustrated in FIG. 11.

By using this molding device 81 illustrated in FIG. 12, the primary fastener member 30 as illustrated in FIGS. 6 and 7 can be molded with the back member 5 supplied to the second surface of the base portion. It is thus possible to manufacture the molded surface fasteners 1 to 3 of Examples 1 to 3 also by using the molding device 81 illustrated in FIG. 12 instead of the molding device 41 illustrated in FIG. 4.

REFERENCE SIGNS LIST 1, 2, 3 Molded surface fastener
5 Back member (mesh raw material)
5a Opening (void)
10 Fastener member
10a, 10b Fastener member
11 Outer wall portion
11a Vertical wall row
11b Connecting wall portion
11c Reinforcing portion
12 Engagement element
13 Lateral wall portion
14 Magnetic wall portion
14a Magnetic wall body
15 Recessed groove portion
16 Engagement region
20 Base portion
20a Base portion (primary base portion)
21 Base body portion
22 Fin strip
26 First base region
27 Second base region
28 Step
29 Gap
30 Primary fastener member (provisional fastener member)
31 Securing protruding portion
40 Manufacturing device
41 Molding device 42 Die wheel
43 Nozzle portion
43a First flow channel
43b Second flow channel
43c Wheel-facing surface (base formation surface)
43d First supply port
43e Second supply port
43f Molding recessed groove portion
44 Pressing roller
45 Pickup roller
45a Upper pinching roller
45b Lower pinching roller
50 Base portion
56 First base region
57 Second base region
57a Center region
57b Outer region
60 Base portion
66 First base region
67 Second base region
67a Flat second base portion
67b Convex second base portion (protrusion)
71 Molding device
72 Die wheel
73 Support roller
74 Pressing roller
75 Pickup roller
76 First nozzle portion
77 Second nozzle portion
81 Molding device
83 Support roller
T1 Thickness dimension from first surface to second surface in second base region

The invention claimed is:

1. A molded surface fastener includes: a fastener member made of a synthetic resin; and a back member formed separately from the fastener member, in which the fastener member has a plate-shaped base portion provided with a first surface and a second surface, and a plurality of engagement elements provided to the first surface of the base portion, and the back member is secured to the second surface of the base portion,
    wherein the back member has a structure enabling the synthetic resin to pass from a first surface to a second surface of the back member or a structure enabling the synthetic resin to penetrate into the back member,
    the base portion has a first base region of a predetermined thickness and a second base region formed to be thicker than the first base region,
    the back member is secured to at least the second base region of the base portion,
    the fastener member has left and right outer wall portions disposed upright along a longitudinal direction of the base portion,
    the left and right outer wall portions are arranged on an outside, in a width direction, of the region where the plurality of engagement elements are formed,
    the second base region is formed in only a region on an outside of the left and right outer wall portions with respect to the width direction of the base portion, and
    the back member is held in a non-secured state in a region inside of the left and right outer wall portions.

2. The molded surface fastener according to claim 1,
wherein a dimension of the second base region in the thickness direction is set smaller than a dimension of the engagement elements in the thickness direction from the first surface of the base portion.

3. The molded surface fastener according to claim 1,
wherein the back member is held in a non-secured state with respect to the first base region.

4. The molded surface fastener according to claim 1,
wherein the second base region has a certain thickness along the longitudinal direction of the base portion.

5. The molded surface fastener according to claim 1,
wherein at least one of a recess and a protrusion is provided to the second base region.

\* \* \* \* \*